April 28, 1925.
E. BELIN
1,535,979
METHOD OF AND APPARATUS FOR SYNCHRONIZATION
Filed Feb. 7, 1925　　　2 Sheets-Sheet 1
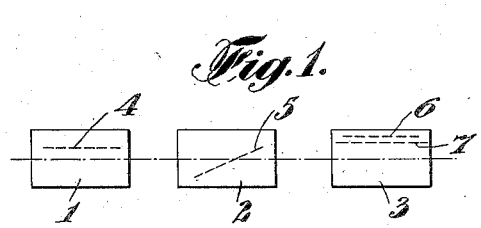
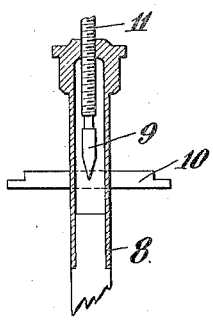
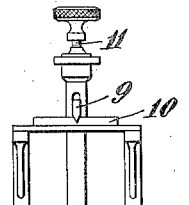
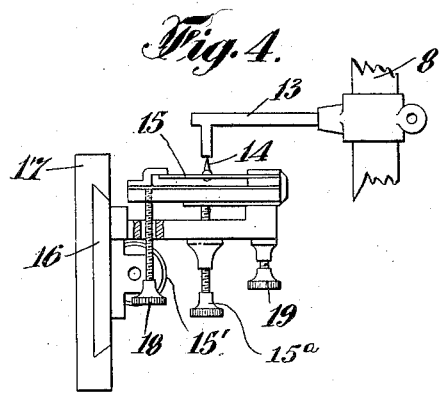
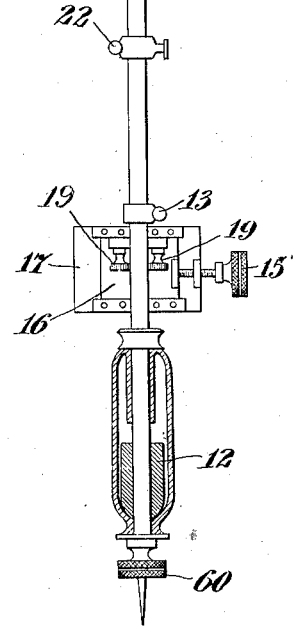
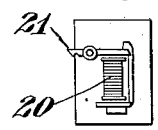
Inventor
Edouard Belin
By his Attorney
Ramsay, Soquet

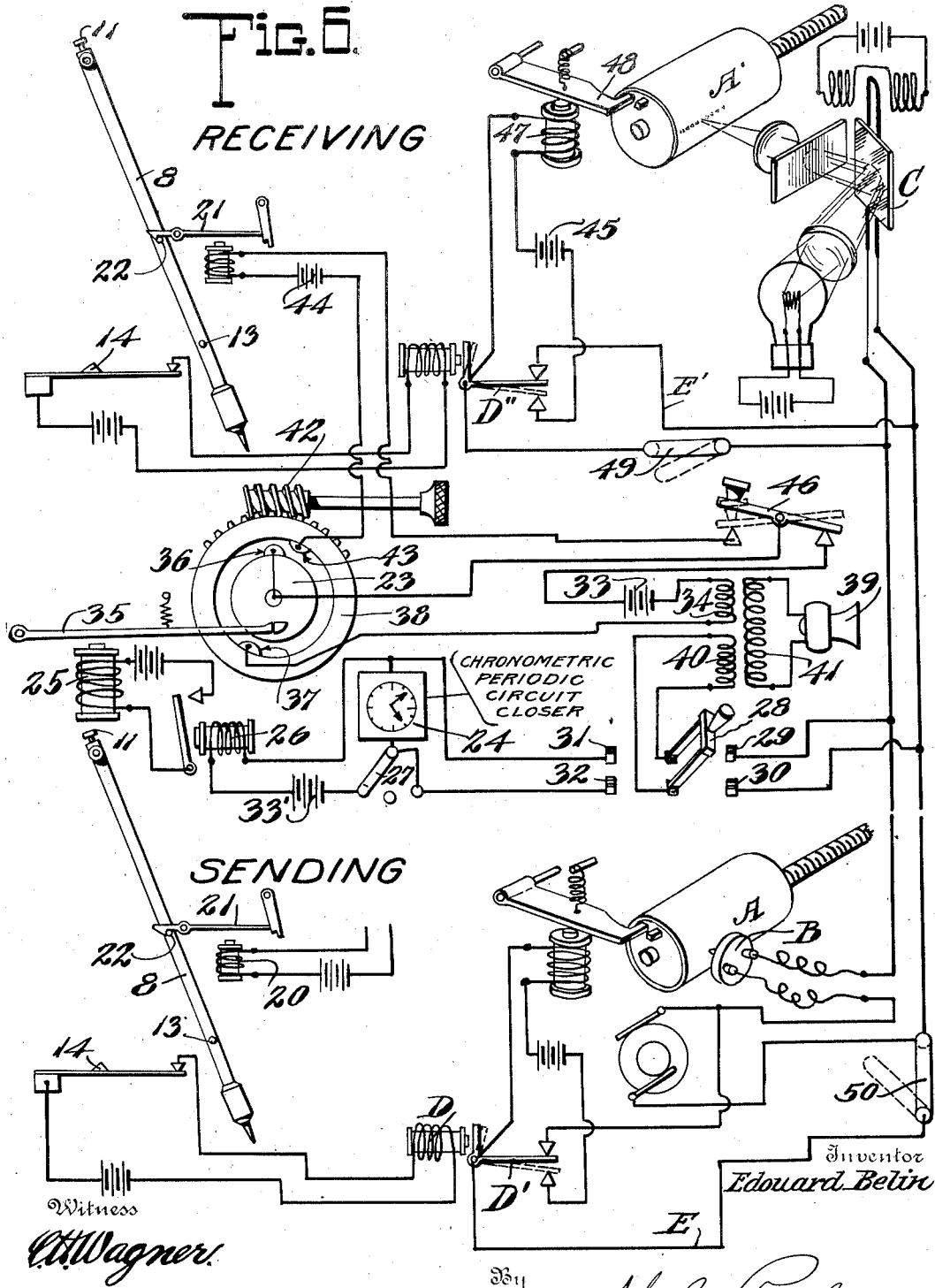

Patented Apr. 28, 1925.

1,535,979

UNITED STATES PATENT OFFICE.

EDOUARD BELIN, OF PARIS, FRANCE.

METHOD OF AND APPARATUS FOR SYNCHRONIZATION.

Application filed February 7, 1925. Serial No. 7,536.

*To all whom it may concern:*

Be it known that I, EDOUARD BELIN, a citizen of the Republic of France, and a resident of Paris, France, have invented an Improvement in Methods of and Apparatus for Synchronization, of which the following is a specification.

The present invention has for its object a new method of operation and apparatus permitting the synchronization and the isochronization at a distance by wire or wireless of two movable apparatuses, such for example as transmitting and recording cylinders.

The method about to be described and the apparatus which it comprises are more particularly adapted to be used in systems for the transmission of all forms of graphic documents by wire or wireless such as are described in my Patents Nos. 1,260,303; 1,443,066; 915,154; and 1,214,989.

In my Patent No. 915,154 is disclosed a system for the transmission of pictures, etc., and in such a system there is employed at the sending station a rotating cylinder on the surface of which the record to be transmitted is arranged, while at the distant or receiving station there is a recording cylinder having a sensitized surface acted upon by a beam of light from an oscillograph. An exploring point moving over the cylinder and in circuit with the oscillograph acts to vary the beam of light. Since this is a well known system of transmission it is unnecessary to describe the same in more detail.

Obviously to make a faithful or clear reproduction of the record to be sent, both the sending and receiving cylinders must move in synchronism and the system which is the subject matter of this invention permits this to be accomplished by means of a system somewhat analogous to the synchronizing system shown in my prior Patent 1,260,303 above referred to.

According to the present invention, however, and for reasons hereinafter pointed out, I employ two oscillating members or pendulums, one at the sending or control station and the other at the receiving station, each having relation to the cylinder of its particular station. The problem of such an arrangement resides in the fact that these pendulums must operate not only in substantial synchronism but also in isochronism,— that is to say, their periodicity, controlled of course by their lengths, must correspond, and they must also operate substantially in phase.

The present invention, then, is characterized as to novelty by the provision for transmitting from the sending station a signal which is sent from or incident to the movement of the pendulum of that station to serve as a guide for the adjustment of the synchronizing apparatus at the receiving station and the release of the one pendulum at the commencement of the stroke of the other whereby synchronization of the two pendulums may be obtained; secondly by the provision for the adjustment of the signal producing means of the pendulum determined from a graphic record on the receiving cylinder whereby to correct any error in the phase of operation of the controlling pendulums.

In the accompanying drawings:—

Figure 1 is a diagrammatic showing of the records produced upon the recording cylinder when the apparatuses are in synchronism and isochronism, out of synchronism, and out of isochronism, respectively;

Figure 2 is an elevation of the form of pendulum or moving element employed with this system;

Figure 3 is a detailed sectional view of the upper end of the pendulum and its mounting;

Figure 4 is an end elevation of the interrupter associated with a contact member mounted upon the pendulum;

Figure 5 is a detail view of the electromagnet and latch employed for holding the pendulum in inoperative position; and Figure 6 is a diagrammatic view showing the complete system comprehended by this invention.

Like reference characters designate corresponding parts throughout the several figures of the drawings.

Specifically describing the invention, and referring to Figures 2 and 3, there is located at the sending station and at each receiving station a free pendulum, the moving element for maintaining synchronism, designated by the reference character 8, which is mounted on the knife suspension 9 and coacting support 10. At the upper end is provided an adjusting screw 11 by means of which the length of the pendulum may be varied, while at the lower end a suitable weight is carried, the position of which is adjusted through the cooperating nut 60.

About one third of the distance from the lower end of the pendulum is mounted a transversely adjustable finger 22 the downwardly turned end of which is designed, in the movement of the pendulum, to wipe across the point 14 of an interrupter or circuit breaker 15 supported in rear of the pendulum. Since this contact must be delicately adjusted, the interrupter is designed to be raised or lowered by means of the adjusting screw 15ª. For reasons hereinafter set forth a lateral adjustment of the interrupter is obtained by the mounting of the same upon a slide 16 in a dovetail groove of the support 17, which slide is shiftable by means of the screw 15′. This enables the positioning of the point 14 directly beneath the knife suspension, or at mid-point in the swing of the pendulum. As a further detail, the extent of break of the interrupter contact may be adjusted by the screw 18 which is arranged to raise or lower the stationary element of the interrupter. An interrupter is placed in a local circuit in the sending and receiving stations, binding posts 19 being provided for this purpose.

Passing now to the synchronizing means by which the synchronization of the various stations is obtained, and referring to Figure 6 of the drawings, each pendulum is first approximately regulated by a suitable time standard of its local station, here shown as a chronometer or periodic circuit closer 24. This is accomplished through a synchronizing device somewhat similar to that shown in my prior Patent No. 1,260,303, and includes a disk 23 which is driven by a suitable motor (not shown), its rate of rotation or speed being adjustable by its rheostat in the known manner set forth in my prior patent. This disk carries a contact 36 which is arranged to coact with the contact 37 of the annulus or adjusting ring 38. When the switch 28 is shifted to the position 31—32, the circuits of the chronometer 24, the relay 26, and the batteries are in operation; the motor driving the disk 23 is started and it will be noted that the stop member 35 would ordinarily stop this disk at each revolution but the speed of the motor is so adjusted that as the magnet 25 draws down the stop member 35 on each stroke of the chronometer this disk is freed for rotation. It will be clear, however, that if the speed of this disk was not sufficiently closely adjusted the member 35 would stop the disk at each rotation. As the contact 36 reaches the contact 37 a beat will be heard in the telephone receiver 39, owing to the closing of the circuit through battery 33 and the primary 34. Likewise a beat from the chronometer 24 is heard in the receiver through the closing of the circuit to the primary 40. If two distinct beats are heard the member 38 may be adjusted by the worm 42 to shift the relative position of contact 42 to bring about synchronization of the 37 to bring about synchronization of the beats in the telephone 39. When this is done there is synchronization with respect to the chronometer and this latter is no longer needed.

The switch 28 is then shifted to the position 29—30 which brings in the signal from the transmitting station, that is, the signal produced by the break in the sending circuit through the interrupter 14 associated with the sending pendulum, and further the signal by which the synchronization is accomplished. This signal will be heard, as stated, in the telephone 39 and the circuit of battery 33 being closed, and the disk 23 running at its synchronized speed as before explained, a beat note will be produced in the telephone 39 from the primary 34 as before, again giving two beat notes. By another movement, assuming that this is necessary, of the worm 42, these beat notes are synchronized to sound as one in the telephone receiver 39, whereupon there is synchronization between the incoming signal and the rate of contact between 36 on the disk 23 and 37 on the member 38.

As shown in Figure 4, the beat note is sent out from the transmitting station at the mid-point of the oscillation of the pendulum, this point being a constant with respect to the swing of a pendulum regardless of the amplitude of swing. In order to obtain synchronization between the two pendulums it is necessary that the release of the pendulum in the receiving station shall take place at the commencement of the stroke of the pendulum of the sending station, whereas the signal from the sending station corresponds to the mid-point of the swing of the pendulum. Consequently, unless provision is made to overcome this discrepancy the two pendulums would be out of time by one-half beat. The means provided to correct this situation consists of the arrangement of the contact 43 on the member 38 diametrically opposite to the contact 37 and this contact includes in its circuit a battery 44 and the release magnet 20 shown particularly in Figure 5 of the drawings. Since the disk 23 makes one revolution to each beat of the pendulum, the circuit mentioned will be closed once for each beat but the point of release of the pendulum will actually be one-half of a beat from the signal which is actually heard. The closing of the circuit through the magnet 20 acts upon the catch 21 which holds the pendulum in its inoperative position through coaction with the stop finger 22 carried by the pendulum and shown on Figure 2 of the drawing, and diagrammatically in Figure 6.

The two moving elements of the sending and receiving stations now being in synchronization, the pendulum at the receiving station is hooked up into its inoperative position until the sending operation is to take place. If now the switch 46 is depressed to close the circuit of the battery 44 the magnet 20 will act as above described and the pendulum will be released at exactly the proper instant to give synchronization with the pendulum in the transmitting station. If the key or switch 46 should not happen to be closed at the proper instant no action through its circuit will take place until the contact 36 actually coacts with the contact 43.

The synchronizing apparatus, it should be understood, is designed primarily to obtain the proper release of the pendulum at the receiving station to insure its synchronized starting with the pendulum in the transmitting station and the apparatus has no function after the pendulum is once started. Thereafter the interrupters 14 control the cylinders of the respective stations.

It will be apparent in the use of a system of this character that, for example, temperature or atmospheric conditions at the two stations may vary, in which event it is easy to understand that the pendulum will not remain in synchronism or isochronism with each other. This condition is graphically depicted upon the recording cylinder and the extent of deviation of the record will serve to indicate the adjustment which is necessary to bring the pendulums again into synchronization with each other.

The application of this synchronizing means to the system of my prior patent No. 915,154 hereinbefore mentioned, is depicted in the diagrammatic showing of Figure 6 wherein A is the sending cylinder, A' the recording cylinder, B the microphone or exploring stylus, and C the oscillograph. The circuit at the sending station which includes the interrupter 14 being normally closed, the relay D releases the current reverser or relay switch D' when the pendulum passes over the point 14 which effects an interruption in the shunt circuit E allowing the current to flow to the oscillograph C at the receiving station. The light reflected by the oscillograph mirror under such condition, as understood in my prior patent, will be allowed to reach the sensitized surface of the recording cylinder which when developed in the usual manner will show a dot upon the record. A series of such dots will be made by these interruptions. The interrupter at the receiving station, operating in the same manner, will effect its relay switch D'' in a like manner. A similar record is produced upon the cylinder of the interruption in the circuit E' by the pendulum at the receiving station. If these interruptions coincide there will be produced on the recording cylinder a record which corresponds to that disclosed by the diagram 1 of Figure 1 of the drawings, namely a dotted line 4 extending longitudinally of the axis of the cylinder. If, however, the record which is produced is an annularly related line as shown at 5 in diagram 2 of Figure 1, it would indicate at once a variation in the length of the pendulum produced by one condition or another, and the adjustment of the pendu'um length is therefore made so as to bring the record to the straight line shown in diagram 1. If the record which is produced discloses two separated lines such as indicated at 6 and 7 of diagram 3 in Figure 1, it will be apparent that the pendulums are out of phase or the interrupter 14 is not in the mid position. The distance apart of these two lines graphically represents the variation in the phase and it is only necessary to adjust the interrupter by means of its adjusting screw 15' until the two lines coincide.

Simultaneously with the interruption of the circuit by the interrupter 14, as above mentioned, the relay switch D'' of the receiving station shifts to close the circuit through battery 45 to the magnet 47 which coacts with the stop member 48 associated with the recording cylinder A', moving said stop member so as to effect release of the receiving cylinder in synchronism with the corresponding release of the sending cylinder.

After the foregoing adjustment has been made the switches 49 and 50 of the transmission circuit are shifted to the dotted line positions, the pendulums thereafter controlling the operation of their respective cylinders. The transmission current under the control of the microphone B then acts directly upon the oscillograph for the reproduction of the record which is placed upon the sending cylinder.

It will be obvious to those skilled in the art that many modifications may be made without departing from the spirit of my invention and that it is capable of many applications other than the specific application described above by way of example; I therefore do not wish to confine myself to the particular details hereinbefore described.

Having thus described my invention, what I claim as new and desire to secure by Letters Patent is:

1. The method of bringing into synchronism two pendulums located at separate places and adapted to have the same periodic movement, which consists in producing a signal by one of said pendulums incident to its movement, sending it to a device related to the other pendulum, adjusting said device to operate in synchronism with the signal, and releasing the second pendulum for movement from said device.

2. The method of bringing into synchronism two movable elements located at separate places and adapted to have the same periodic movement, which consists in synchronizing a control device for one of said movable elements with a time standard, producing a signal from the said movable element, and causing the release of the other element in synchronism with said signal.

3. The method of bringing into synchronism two movable elements located at separate places and adapted to have the same periodic movement, which consists in synchronizing a control device for each element with a corresponding time standard to obtain substantial correspondence of periodicity of movement of the said elements, producing a signal by the movement of one of said elements, and resynchronizing the movement of the other element from the signal aforesaid to obtain substantial correspondence of movement of the two elements.

4. The method of bringing into synchronism two movable elements located at separate places and adapted to have the same periodic movement, which consists in synchronizing a control device for each element with a corresponding time standard to obtain substantial correspondence of periodicity of movement of the said elements, producing a signal by the movement of one of said elements, adjusting the control device of the other element to accord with the signal, and releasing said other element by said adjusted control device.

5. The method of bringing into synchronism two movable elements located at distant stations, which consists in causing a signal to be produced at each station, synchronizing each element with its own station signal, releasing the element of one station and causing a signal to be sent between the two stations by one of said elements, resynchronizing the element at the other station with the inter-station signal, and releasing the element at the said other station.

6. The method of bringing into synchronism two oscillating members located at separated stations which consists in causing a signal to be produced at a point intermediate the extremes of oscillation of the member at one station and sending said signal to the distant station, timing the release of the oscillating member at said distant station from said signal to take place at the extremes of oscillation, and finally causing said release.

7. The method of synchronizing transmitting and recording cylinders of a record transmission system and located in widely separated stations, which consists in synchronizing the movement of a controlling member with that of the transmitting cylinder, sending a signal to the receiving station by said controlling member, synchronizing a controlling member at the receiving station with said signal, and releasing the last mentioned controlling member to operate in phase with the controlling member of the transmitting station.

8. The steps in the method of synchronizing two movable elements one at a transmitting station and the other at a receiving station, which consists in sending a signal by the movable element at the transmitting station, simultaneously producing a signal by the movable element at the receiving station, and recording the two signals by common means responsive thereto.

9. The method of synchronizing two movable elements one at a transmitting station and the other at a receiving station, which consists in sending a signal by the movable element at the transmitting station, simultaneously producing a signal by the movable element at the receiving station, recording the two signals by common means responsive thereto, and adjusting the movable elements and the signal producing means according to the record produced.

10. The method of synchronizing transmitting and recording cylinders located at distant stations which consists in synchronizing the release of periodically operating pendulums associated with the cylinders, and finally controlling the release of the cylinders from said pendulums.

11. Means for maintaining synchronism between distant stations comprising two movable elements, a transmitting circuit, signal means in said circuit with which said movable elements coact during movement, and means by which one of said members may be synchronized from the signal of the other.

12. Means for maintaining synchronism between distant stations comprising two movable elements, a transmitting circuit, signal means in said circuit with which said movable elements coact during movement, means by which one of said members may be synchronized from the signal of the other, and means for releasing the movable member through its synchronized means.

13. Means for maintaining synchronism between distant stations comprising two movable elements, a transmitting circuit, signal means in said circuit with which said movable elements coact during movement, means by which one of said members may be synchronized from the signal of the other, means for releasing the movable member through its synchronized means, and means at one of said stations for recording the signals from both of said stations.

14. Means for obtaining and maintaining synchronization between transmitting and receiving stations comprising an oscillating member at each station, means at the sending station for sending a signal to the receiving station from a point between the extremes of oscillation, means at the receiving station by which the oscillating member at the said station may be synchronized with the signal from the sending station, and means coacting with the synchronizing means for releasing the last mentioned oscillating member at the commencement of stroke of the oscillating member at the sending station.

15. Synchronizing apparatus for maintaining synchronism of movable members of distantly related transmitting and receiving stations, comprising a pendulum, a synchronizing device therefor, an electric circuit in which said device is included for producing a beat, a standardized circuit closer and circuit therefor, a receiver associated with said circuits to detect the variations between the beats of the synchronizing device and the time standard, and means for releasing the pendulum in timed relation to the beat of the circuit of the synchronizing device.

16. Synchronizing apparatus for maintaining synchronism of movable members at distantly related transmitting and receiving stations, comprising a pendulum, means for holding the pendulum inactive, a control device including means to actuate said holding means at a predetermined time to release the pendulum, means for detecting a signal from the sending station, and means for effecting release movement of the pendulum holding means through the control device in synchronism with the signal from the sending station.

17. An arrangement for synchronizing apparatus having similar periodic movements and situated at distantly related stations, comprising members having isochronous movements provided at each station, signal recording means at one of said stations, signal producing means at each station operated from the members aforesaid, the signals from which are recorded by said recording means, and means for releasing the recording means through the signal means.

18. An arrangement for synchronizing apparatus having similar periodic movements and situated at distantly related stations, comprising oscillating members having isochronous movements provided at said stations, transmitting and recording cylinders at the respective stations, signal producing means associated with each oscillating member including an electric circuit and interrupters therefor at the said stations, the signals from which are recorded on the recording cylinder, means for adjusting the oscillating members to produce coincidence of the recording signals, and means operated from the interrupters controlling the operation of the respective cylinders.

In testimony whereof, I have signed my name to this specification this 5th day of February, 1925.

EDOUARD BELIN.